2,881,217
Patented Apr. 7, 1959

2,881,217

PREPARATION OF DIAMINO-1-ALKENES

Richard C. Doss and Howard W. Bost, Bartlesville, Okla., assignors to Phillips Petroleum Company, a corporation of Delaware No Drawing. Application July 29, 1955
Serial No. 525,346

13 Claims. (Cl. 260—583)

This invention relates to the preparation of diamino-1-alkenes. In one aspect this invention relates to reacting a halo-aldehyde with a secondary amine to prepare a diamino-1-alkene.

According to the invention there is provided a method of preparing a diamino-1-alkene characterized by the following structural formula

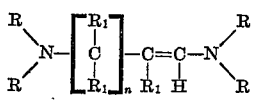

wherein: each $R_1$ is a member selected from the group consisting of hydrogen, alkyl, cycloalkyl, alkenyl, cycloalkenyl, aryl, alkaryl and aralkyl radicals; each R is a member selected from the group consisting of alkyl, cycloalkyl, alkenyl, cycloalkenyl, aryl, alkaryl, and aralkyl radicals, and said R's can be alike and unlike; $n$ is an integer selected from the group consisting of 0, 1 and 2; the number of carbon atoms in $R_1$ does not exceed 18; and the total number of carbon atoms in the molecule does not exceed 30; which method comprises reacting a secondary amine and a haloaldehyde having at least one hydrogen atom attached to the carbon atom alpha to the aldehyde group.

While the invention can be employed to prepare diamino-1-alkenes having the above described structural formula, it is particularly adapted to the preparation of 1,2-diamino-1-alkenes characterized by the following structural formula

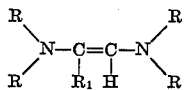

wherein R and $R_1$ are defined as described above.

It is presently believed that the reaction involved in the method of our invention can be represented by the following equation

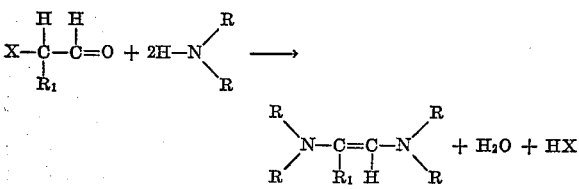

wherein R and $R_1$ are defined as described above, and "X" is a halogen such as chlorine, bromine, fluorine, and iodine, preferably chlorine or bromine.

Representative amines which can be used in the method of our invention include, among others, the following: dimethylamine, diethylamine, methylethylamine, dibutylamine, dipropylamine, diisopropylamine, diallylamine, diphenylamine, dibenzylamine and di-(4-methylphenyl)-amine.

Halo-aldehydes which can be used in the method of our invention can be characterized by the following structural formula

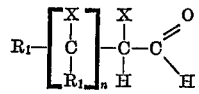

wherein $R_1$ and $n$ are as previously defined; X is selected from the group consisting of halogen, hydrogen, and $R_1$; and not more than one X is halogen. Examples of these aldehydes include, among others, the following: chloroacetaldehyde, 2-bromopropionaldehyde, 2-chloro-n-butyraldehyde, 4 - chloro-n-valeraldehyde, 3 - chloropropionaldehyde, 2-chloro-3,3 - dimethylbutyraldehyde, 2-chlorostearaldehyde, fluoroacetaldehyde, 2 - iodopropionaldehyde, 3-chloro-4,4-dimethylvaleraldehyde, 4-chloro-n-butyraldehyde, 2-chlorocitronellaldehyde, 2-chloro-5-cyclohexylvaleraldehyde, 2-chloro-7-phenylcaprylaldehyde, 2-chloro-3 - (4 - methylphenyl)propionaldehyde and 3-chloro-4-hexyltetradecyl aldehyde. It is to be noted that all of the said aldehydes have a hydrogen atom attached to the carbon atom alpha to the aldehyde group. Generally speaking, it is preferred to use the alpha-halo-aldehydes. However, those halo-aldehydes having the halogen atoms on a beta or a gamma carbon atom can be used to prepare diamino-1-alkenes which are within the scope of the invention.

The particular aldehydes and amines to be used will be determined by the diamino-1-alkene which it is desired to prepare, as will be understood by those skilled in the art. Included among the compounds which can be prepared according to the invention are the following: N,N,N',N'-tetramethyl-1,2 - diaminoethylene, N,N,N',N'-tetramethyl-1,2-diamino-1-butene, N,N - dimethyl-N',N'-diallyl-1,2-diaminoethylene, N,N'-dimethyl-N,N'-diethyl-1,2-diaminoethylene, N,N,N',N'-tetrabutyl - 1,3-diaminopropene, N,N,N',N' - tetramethyl - 1,2 - diamino - 3,3-dimethyl-1-butene, N,N,N',N' - tetrabutyl - 1,4 - diamino-1-pentene, N,N,N',N' - tetraethyl - 1,2 - diamino - 1-octadecylene, N,N,N',N' - tetramethyl - 1,4 - diamino-1-butene, N,N,N',N' - tetraethyl - 1,2 - diamino - 1 - propene, N,N,N',N' - tetraethyl - 1,3 - diamino - 4,4-dimethyl-1 - pentene, N,N,N',N' - tetrabutyl - 1,2 - diamino - 5-cyclohexyl - 1 - pentene, N,N,N',N' - tetramethyl - 1,2-diamino - 7 - phenyl - 1 - octene, N,N,N',N' - tetraethyl-1,2 - diamino - 3 - (2 - cyclohexenyl) - 1 - propene, N,N, N',N' - tetramethyl - 1,3 - diamino-2-(4-methylphenyl)-1 - propene, N,N,N',N' - tetramethyl - 1,3 - diamino-4-hexyl - 1 - tetradecene, N,N,N',N' - tetraphenyl - 1,2 - diaminoethylene, N,N,N',N' - tetracyclohexyl - 1,2-diamino-3,3 - dimethyl - 1 - butene, N,N,N',N' - tetra - (4 - methylphenyl) - 1,2 - diaminoethylene, N,N,N',N' - tetrabenzyl-1,2 - diaminoethylene and N,N,N',N'-tetramethyl-1,2-diamino-3,7-dimethyl-1,7-octadiene.

If desired the reaction can be carried out in the presence of a suitable organic solvent. Any solvent which is non-reactive with the reagents being used or the product being prepared, i.e., which is inert under the reaction conditions, is a suitable solvent. Examples of suitable solvents are: diethyl ether, dimethyl ether, benzene, toluene, pentane, methylcyclopentane, cyclohexane, octanes and the like. The solvent can be added separately to the reaction mixture, or either or both of the reactants can enter the reaction zone along with the solvent.

The reaction can be carried out under anhydrous conditions or in the presence of water. Generally speaking, when anhydrous conditions are employed the reaction proceeds more vigorously; more heat is released in a given time and it is sometimes necessary to employ a higher boiling solvent than when water is present in the reaction zone. It is sometimes more convenient to use aqueous solutions of the reactants because one or more of the said reactants is commonly commercially available in aqueous solutions. Chloroacetaldehyde, for example, is commercially available in approximately 40 percent aqueous solution.

In one method for carrying out the reaction, the amine and solvent (if a solvent is employed) are added to a reaction vessel and the temperature of the mixture is adjusted to between −25 and 35° C. preferably between −15 and 0° C. The reaction mixture should be maintained in liquid phase. The halo-aldehyde is then added slowly, with stirring, so as to maintain the temperature in the reaction zone within the said limits. The mol ratio of amine to aldehyde used is in the range of 2:1 to 5:1. After the addition of the halo-aldehyde is completed the temperature of the reaction mixture is adjusted to a temperature within the range of 20 to 35° C., preferably between 20–30° C., and agitated for a period of time within the range of about 30 minutes to about 10 hours. The period of agitation will generally depend upon the amount of yield desired. If aqueous solutions of the reactants are used, the aqueous layer of the reaction mixture is separated from the non-aqueous layer. Said aqueous layer is then extracted with separate additional fresh portions of the same solvent employed (if a solvent was employed) in carrying out the reaction. The extract or extracts of said aqueous layer are then combined with said non-aqueous layer and the combined layers are distilled, preferably at reduced pressure, to recover the product therefrom. While the invention has been described in terms of a batch process it will be understood by those skilled in the art that continuous type reaction systems can be employed.

The following example further illustrates the invention:

EXAMPLE I

To a one liter glass reaction vessel there was added 200 milliliters of methylcyclopentane and 220 milliliters of dimethylamine. The reaction vessel was placed in an acetone-Dry Ice bath and, after cooling to −8° C., 186 grams of a 40 percent by weight aqueous solution of chloroacetaldehyde was added dropwise with stirring. The temperature of the reaction mixture was maintained between −10 and 0° C. for the approximately 30 minutes required to add the chloroacetaldehyde. The temperature of the black colored mixture was permitted to rise to room temperature (about 25° C.) and was stirred 2 hours at this temperature.

The aqueous layer of the reaction mixture was separated and extracted 3 times with methylcyclopentane. The extracts were then combined with the non-aqueous phase of the reaction mixture, dried overnight with magnesium sulfate, filtered, and distilled at reduced pressure. The distillation data is given in Table I with the product indicated as cuts 3 to 7 inclusive.

Table I
[Pressure—15 mm. mercury]

| Cut No. | Overhead temp., °C. | Distillate collected, gms. | Distillate, refractive index |
|---|---|---|---|
| 1 | | 33.4 | |
| 2 | 30 | 62.8 | 1.4207 |
| 3 | 38 | 9.1 | 1.4643 |
| 4 | 38 | 9.8 | 1.4655 |
| 5 | 40 | 9.0 | 1.4658 } product. |
| 6 | 40 | 8.4 | 1.4658 |
| 7 | 40 | 4.8 | 1.4648 |

| | Grams |
|---|---|
| Charge | 336.5 |
| Residue | 20.1 |
| Trap | [1] 170.0 |
| Distillate | 142.3 |
| Loss | 4.1 |

[1] Mainly methylcyclopentane collected in a trap maintained in a Dry Ice-acetone bath to prevent vapors from entering vacuum pump.

A sodium fusion was made on cut Number 5 and a qualitative test for halogen indicated none was present. Solutions of potassium permanganate and bromine were absorbed by the product, indicating the presence of a double bond. A titration of a portion of the product with hydrochloric acid caused decomposition yielding the free amine.

Cuts 4 and 7 were hydrogenated in the presence of nickel in a Parr hydrogenation bomb at a pressure of 40 pounds per square inch gage and room temperature. The refractive index of the hydrogenated sample was 1.4180 at 25° C. as compared with 1.4170 at 25° C. for a sample of N,N,N′,N′-tetramethylethanediamine. These tests serve to characterize the product as N,N,N′,N′-tetramethyl-1,2-diaminoethylene. The product yield was 38 percent of theoretical based on the chloroacetaldehyde charged.

The compounds prepared according to the invention are useful as hypergolic fuels and as components of fast burning fuels as disclosed and claimed in the copending application of J. E. Mahan, Serial No. 525,347, filed July 29, 1955. The following example illustrates the hypergolicity of 1,2-diaminoethylene.

EXAMPLE II

A drop test apparatus comprising an injection nozzle inserted to within 1″ of the bottom of a 1″ × 8″ test tube was employed to determine the ignition delay in milliseconds of N,N,N′,N′-tetramethyl-1,2-diaminoethylene. A small quantity of said diaminoethylene (0.2 ml.) was placed in the bottom of the test tube and 0.3 ml. of white fuming nitric acid was injected into the fuel. A constant pressure nitrogen surge chamber provided a source of approximately 40 p.s.i.g. pressure to inject the oxidizer into the fuel. A solenoid coil actuated the injector to provide an accurately metered amount of oxidant. The ignition delay interval was determined as the time between contact of the oxidizer with the fuel and the presence of flame as sensed by a photocell. An ignition delay of said diaminoethylene at 75° F. was 3.6 milliseconds, and at −40° F. was 12.6 milliseconds. These data show that the said diaminoethylene is one of the best hypergols yet discovered.

Although the process has been described as a batch operation, it will be apparent to those skilled in the art that a continuous system can be employed without departing from the inventive concept described herein.

As will be evident to those skilled in the art various modifications of the invention can be made, or followed, in the light of the foregoing disclosure.

We claim:

1. A method of preparing a diamino-1-alkene characterized by the following structural formula

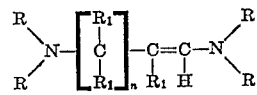

wherein: each $R_1$ is a member selected from the group consisting of hydrogen, and alkyl, cycloalkyl, alkenyl, cycloalkenyl, aryl, alkaryl and aralkyl radicals containing from 1 to 17 carbon atoms; each R is a member selected from the group consisting of alkyl, cycloalkyl, alkenyl, aryl, alkaryl, and aralkyl radicals containing from 1 to 7 carbon atoms; $n$ is an integer selected from the group consisting of 0, 1 and 2; and the total number of carbon atoms in the molecule does not exceed 30; which method comprises reacting a secondary amine and a halo-aldehyde having at least one hydrogen atom attached to the carbon atom alpha to the aldehyde group, said halo-aldehyde being characterized by the following structural formula

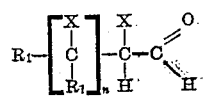

wherein $R_1$ and $n$ are as previously defined; X is selected from the group consisting of halogen, hydrogen, and $R_1$; and not more than one X is halogen.

2. The method of claim 1 wherein said halo-aldehyde is an alpha-halo-aldehyde.

3. The method of claim 1 wherein said reaction is carried out in the presence of a suitable organic solvent which is inert under the reaction conditions.

4. The method of claim 1 wherein said halo-aldehyde is chloroacetaldehyde and said secondary amine is dimethylamine.

5. The method of claim 1 wherein said diamino-1-alkene is N,N,N',N'-tetramethyl-1,2-diaminoethylene.

6. The method of claim 1 wherein said diamino-1-alkene is N,N,N',N'-tetraethyl-1,2-diaminoethylene.

7. The method of claim 1 wherein said diamino-1-alkene is N,N,N',N'-tetramethyl-1,2-diamino-1-butene.

8. The method of claim 1 wherein said diamino-1-alkene is N,N,N',N'-tetramethyl-1,2-diamino-1-hexene.

9. The method of claim 1 wherein said diamino-1-alkene is N,N'-dimethyl-N,N'-diethyl-1,2-diaminoethylene.

10. A method for preparing a diamino-1-alkene having a structural formula as defined in claim 1 wherein said reactants are reacted in a mol ratio of amine to aldehyde in the range of 2:1 to 5:1, in the presence of a suitable organic solvent which is inert under the reaction conditions, and at a temperature within the range of −25 to 35° C.

11. A method for the preparation of a diamino-1-alkene having a structural formula as defined in claim 1 which comprises: adding a halo-aldehyde to a secondary amine in a reaction zone in a mol ratio of amine to aldehyde in the range of 2:1 to 5:1 at a temperature maintained within the range of −25 to 35° C. to form a reaction mixture; warming said reaction mixture to a temperature within the range of 20 to 35° C.; agitating said warmed reaction mixture for a period of time of from about 30 minutes to about 10 hours; dehydrating at least a portion of said reaction mixture; and recovering said diamino-1-alkene from said dehydrated reaction mixture.

12. A method for the preparation of a diamino-1-alkene having a structural formula as defined in claim 1 which comprises: adding an aqueous solution of a halo-aldehyde to a solution of a secondary amine in a suitable organic solvent which is inert under the reaction conditions in a reaction zone in a mol ratio of amine to aldehyde in the range of 2:1 to 5:1 at a temperature maintained within the range of −25 to 35° C. to form a reaction mixture having an aqueous phase and a non-aqueous phase; warming said reaction mixture to a temperature within the range of 20 to 35° C.; agitating said warmed reaction mixture for a period of time of from about 30 minutes to about 10 hours; separating said aqueous phase from said non-aqueous phase; extracting said separated aqueous phase with a fresh portion of said organic solvent; adding the extract from said extraction to said non-aqueous phase; dehydrating said combined extract and non-aqueous phase; and recovering said diamino-1-alkene from said dehydrated extract and non-aqueous phase.

13. A method for the preparation of 1,2-diaminoethylene which comprises: adding an aqueous solution of chloroacetaldehyde to a solution of dimethylamine in methylcyclopentane in a reaction zone in a mol ratio of amine to aldehyde in the range of 2:1 to 5:1 at a temperature maintained within the range −10 to 0° C. to form a reaction mixture having an aqueous phase and a non-aqueous phase; warming said reaction mixture to a temperature within the range of 20 to 35° C.; agitating said warmed reaction mixture for a period of time of from about 30 minutes to about 10 hours; separating said aqueous phase from said non-aqueous phase; extracting said separated aqueous phase with a fresh portion of said organic solvent; adding the extract from said extraction to said non-aqueous phase; dehydrating said combined extract and non-aqueous phase; and recovering said diamino-1-alkene from said dehydrated extract and non-aqueous phase.

References Cited in the file of this patent

UNITED STATES PATENTS

| | | |
|---|---|---|
| 2,440,724 | Morey | May 4, 1948 |
| 2,565,488 | Finch et al. | Aug. 28, 1951 |